Sept. 5, 1961 T. F. ZLOTEK 2,998,875
SPRAG RETAINER FOR ONE-WAY CLUTCHES
Filed June 2, 1958 2 Sheets-Sheet 1

INVENTOR.
THADDEUS F. ZLOTEK
BY
*Whittemore Halbert & Belknap*
ATTORNEYS

Sept. 5, 1961 T. F. ZLOTEK 2,998,875
SPRAG RETAINER FOR ONE-WAY CLUTCHES
Filed June 2, 1958 2 Sheets-Sheet 2

INVENTOR.
THADDEUS F. ZLOTEK
BY
*Whittemore Hulbert & Belknap*
ATTORNEYS

United States Patent Office 2,998,875
Patented Sept. 5, 1961

2,998,875
SPRAG RETAINER FOR ONE-WAY CLUTCHES
Thaddeus F. Zlotek, Detroit, Mich., assignor to Formsprag Company, Warren, Mich., a corporation of Michigan
Filed June 2, 1958, Ser. No. 739,089
4 Claims. (Cl. 192—45.1)

The invention relates to one-way clutches of the sprag type and more particularly where the sprags are mounted in a retainer by means of projecting end pivots or trunnions. It is the object of the invention to obtain a retainer construction with which the sprags may be easily assembled and maintained in operative relation to each other and the energizing means therefor. To this end the invention consists in the construction as hereinafter set forth.

Figure 1:
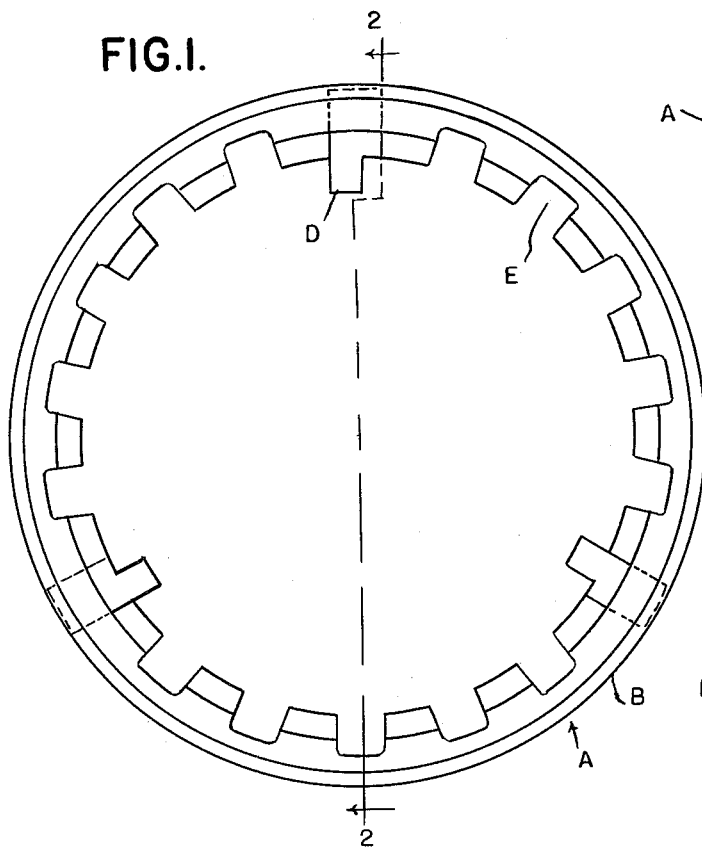
Figure 2:
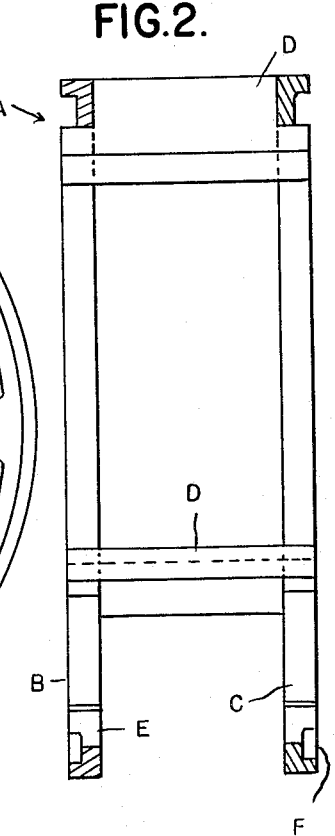
Figure 4:
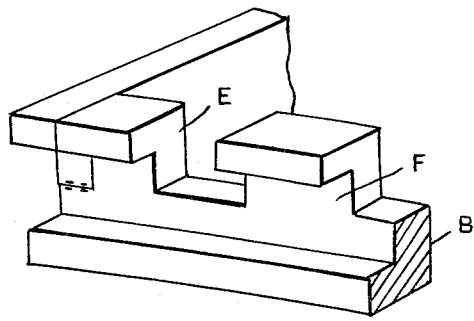
Figure 3:
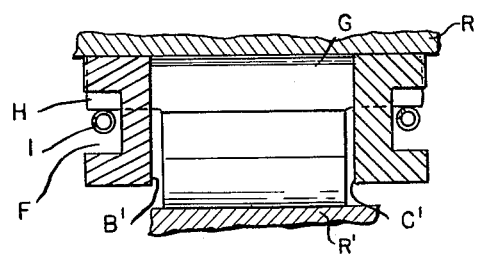
Figure 5:
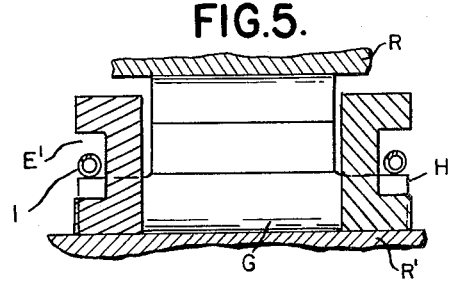
Figure 6:
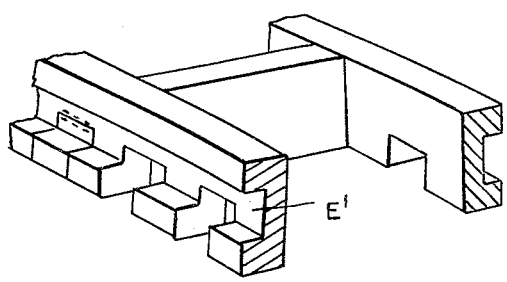

In the accompanying drawings:

FIG. 1 is a side elevation of the retainer.
FIG. 2 is a cross section on line 2—2 of FIG. 1.
FIG. 3 is a cross section showing a sprag assembled with a retainer, clutch races and the energizing means.
FIG. 4 is a perspective view of a portion of FIG. 3.
FIGS. 5 and 6 are similar to FIGS. 3 and 4, respectively, showing a modified construction.

As shown in FIGS. 1 and 2 the retainer A includes a pair of coaxial spaced rings B and C connected to each other by a plurality of cross bars D. Each ring has therein a series of spaced radial slots E which extend partly through the same and are open through either the outer or the inner periphery. Each ring also has an annular groove F in its outer side face which intersects with said slots. The sprags G which may be of any suitable cross sectional contour are of a length for positioning between the inner faces B', C' of said rings and have coaxial trunnions H projecting outward from their opposite ends. In this respect they are similar to the sprags shown and claimed in my copending application, Serial No. 739,090, filed of even date herewith. The trunnions pivotally fit within the radial slots E and may be entered therein through the open end and moved to extend within the annular grooves F. As shown in FIGS. 3 and 4 the slots open through the outer periphery of the retainer and the sprags are inserted from outside thereof between the rings simultaneously with the insertion of the trunnions in the slots, being moved radially inward to extend within the annular grooves F. Outwardly expanding annular energizing springs I are also inserted within the grooves F in contact with the inner faces of the trunnions which are at a suitable angle for biasing the sprags to tilt towards clutch engaging position, in which they engaged between races R' and R" of the clutch. In FIGS. 5 and 6 the trunnions of the sprags are engaged with slots E' through the inner periphery and the energizing springs I' contractively engage a cammed outer face of the trunnion. Whichever specific construction is used, as illustrated in my copending application identified above, the sprags are easily assemled with the retainer by entering the trunnions through the open ends of the slots and when positioned inserting the energizing springs in the annular grooves which completes the assembly.

What I claim as my invention is:

1. A one-way clutch comprising a pair of annular, radially spaced inner and outer races, sprags having surfaces facing and engaging said races in the radial space therebetween and having trunnions projecting outwardly from opposite axial ends of the sprags, a retainer to retain said sprags in place, comprising a pair of parallel rings spaced axially from one another to receive the sprags radially in the axial space between said rings, and circumferentially spaced cross members extending axially between and fixedly connecting said rings to one another, said rings having slots extending only partially therethrough radially thereof and opening radially through a periphery thereof, said slots also opening axially inwardly to said space between said rings and receiving said trunnions axially outwardly of said respective sprag ends, said rings being further provided with axially facing grooves in the respective outer side faces thereof, which grooves circumferentially intersect said slots, and annular energizing means received in said grooves and acting against said respective trunnions to urge said sprags against a race toward which said slots open.

2. A sprag and retainer structure for a one-way clutch comprising a retainer including a pair of parallel rings spaced axially from one another to receive sprags radially in the axial space between said rings, and circumferentially spaced cross members extending axially between and fixedly connecting said rings to one another, sprags received radially in said axial space and having trunnions extending axially from opposite axial ends of the respective sprags, said rings having slots extending only partially therethrough radially thereof and opening radially through a periphery thereof, said slots also opening axially inwardly to said space between said rings and receiving said trunnions axially outwardly of said respective sprag ends, said rings being further provided with axially facing grooves in axially facing side faces thereof, which grooves circumferentially intersect said slots, and annular energizing means received in said grooves and acting against said respective trunnions to urge said sprags radially.

3. A clutch in accordance with claim 1 in which said trunnions are located adjacent the inner race engaging surface of the sprag and said slots open through the inner periphery of each of said rings.

4. A clutch in accordance with claim 1 in which said trunnions are located adjacent the outer race engaging surface of the sprag and said slots open through the outer periphery of each of said rings.

References Cited in the file of this patent

UNITED STATES PATENTS

| | | |
|---|---|---|
| 2,154,212 | Moorhouse | Apr. 11, 1939 |
| 2,599,793 | Warner | June 10, 1952 |
| 2,625,246 | Szady | Jan. 13, 1953 |
| 2,835,363 | Long | May 20, 1958 |